United States Patent [19]
Young

[11] Patent Number: 5,719,868
[45] Date of Patent: Feb. 17, 1998

[54] DYNAMIC DISTRIBUTED, MULTI-CHANNEL TIME DIVISION MULTIPLE ACCESS SLOT ASSIGNMENT METHOD FOR A NETWORK OF NODES

[75] Inventor: Charles David Young, Plano, Tex.

[73] Assignee: Rockwell International, Costa Mesa, Calif.

[21] Appl. No.: 539,396

[22] Filed: Oct. 5, 1995

[51] Int. Cl.$^6$ ................................................. H04J 3/14
[52] U.S. Cl. .................... 370/436; 370/443; 370/461; 370/478
[58] Field of Search .................... 370/310, 312, 370/313, 314, 315, 321, 328, 329, 330, 336, 337, 338, 345, 347, 348, 431, 432, 436, 478, 442, 443, 458, 461, 462, 498, 522, 447, 450, 451; 455/33.1, 33.2, 34.1, 34.2, 56.1; 375/201, 202, 203

[56] References Cited

U.S. PATENT DOCUMENTS

| | | | |
|---|---|---|---|
| 4,308,613 | 12/1981 | Chasek | 370/396 |
| 4,612,637 | 9/1986 | Davis et al. | 370/348 |
| 4,639,914 | 1/1987 | Winters | 370/334 |
| 4,688,259 | 8/1987 | Eldridge | 455/13.3 |
| 4,730,310 | 3/1988 | Acampora et al. | 370/334 |
| 4,868,811 | 9/1989 | Suzuki | 370/436 |
| 4,937,822 | 6/1990 | Weddle et al. | 370/436 |
| 4,979,168 | 12/1990 | Courtois et al. | 370/349 |
| 5,038,398 | 8/1991 | Wills | 455/13.1 |
| 5,040,175 | 8/1991 | Tuch et al. | 370/245 |
| 5,046,066 | 9/1991 | Messenger | 370/349 |
| 5,124,985 | 6/1992 | Hoshikawa | 370/347 |
| 5,134,615 | 7/1992 | Freeburg et al. | 370/436 |
| 5,164,942 | 11/1992 | Kamerman et al. | 370/334 |
| 5,197,127 | 3/1993 | Waclawsky et al. | 395/200.1 |
| 5,204,855 | 4/1993 | Bebee et al. | 370/436 |
| 5,204,856 | 4/1993 | Bebee et al. | 370/436 |
| 5,216,591 | 6/1993 | Nemirovsky et al. | 364/401 |
| 5,220,564 | 6/1993 | Tuch et al. | 370/338 |
| 5,226,045 | 7/1993 | Chuang | 370/332 |
| 5,231,634 | 7/1993 | Giles et al. | 370/348 |
| 5,239,673 | 8/1993 | Natarajan | 455/33.1 |
| 5,245,609 | 9/1993 | Ofek et al. | 370/235 |
| 5,291,474 | 3/1994 | Ikonen et al. | 370/281 |
| 5,291,475 | 3/1994 | Bruckert | 370/330 |
| 5,291,515 | 3/1994 | Uchida et al. | 375/200 |
| 5,359,595 | 10/1994 | Weddle et al. | 370/478 |
| 5,448,621 | 9/1995 | Knudsen | 370/329 |
| 5,570,352 | 10/1996 | Pöyhönen | 370/330 |
| 5,581,548 | 12/1996 | Ugland et al. | 370/330 |

OTHER PUBLICATIONS

"A Link Allocation Protocol for Mobile Multi–hop Radio Networks", I. Chlamtac and A. Lerner, *Proc. GLOBECOM 85*, Dec. 1985, pp. 238–242.

"Distributed Node Organization Algorithm for Channel Access in a Multihop Dynamic Radio Network", L. Chlamtac and S. S. Pinter, *IEEE Transactions on Computers*, vol. 36, Jun. 1987, pp. 728–737.

"Fair Algorithms for Maximal Link Activation in Multihop Radio Network", I. Chlamtac and A. Lerner, *IEEE Trans.Comm*, vol. 35, No. 7, Jul. 1987, pp. 739–746.

(List continued on next page.)

*Primary Examiner*—Wellington Chin
*Assistant Examiner*—Huy D. Vu
*Attorney, Agent, or Firm*—Kyle Eppele

[57] ABSTRACT

A method for automatically managing the communication channel resources between two nodes having neighboring nodes in a network of transceiver nodes, wherein each node communicates during specific time slots and uses multiple frequencies on a time division multiple access basis includes the steps of storing a table of possible communication frequencies and time slots between nodes; and announcing and transmitting during a specific time slot, a selected transmit frequency and slot from a first node to a second node and all neighboring nodes of the first node. The announced frequency and slot have certain constraints on reuse within two hops of the transmitting node to thereby establish contention free communication on that frequency and slot between the first and second nodes.

6 Claims, 1 Drawing Sheet

OTHER PUBLICATIONS

"Decoupling Link Scheduling Constraints in Multihop Packet Radio Networks", Craig G. Prohazka, *IEEE Trans. Computers*, vol. 38, No. 3, Mar., 1989, pp. 455–458.

"Host Extensions for IP Multicasting", S. Deering., *Internet Engineering Task Force Request for Comments* 1112, Stanford University, Aug. 1989, pp. 1–17.

"Distributed Assignment Algorithms for Multihop Packet Radio Networks", Israel Cidon and Moshe Sidi, IEEE Trans. Computers, vol. 38, No. 10, Oct. 1989, pp. 1353–1361.

"A Distributed Time–Slot Assignment Protocol for Mobile Multi–Hop Broadcast Packet Radio Networks", L.C. Pond and Victor O.K. Li, Proc. IEEE MILCOM '89, vol. 1, Nov. 1989, pp. 70–74.

"Evaluation of Slot Allocation Strategies for TDMA Protocols in Packets Radio Networks", D. S. Stevens and M. H. Ammar, Proc. IEEE MILCOM '90, vol. 2 Oct. 1990, pp. 835–839.

"A Distributed TDMA Rescheduling Procedure for Mobile Packet RadioNetworks", D. S. Stevens and M. H. Ammar, Proc. ICC '91, vol. 3, Jun. 1991.

"A Topology Transparent Link Activation Protocol for Mobile CDMA Radio Networks", I. Chlamtac, A. Farago and H. Y. Ahn, IEEE J. on Selected Areas in Comm., vol. 12, No. 8, Oct. 1994, pp. 1426–1433.

DYNAMIC DISTRIBUTED, MULTI-CHANNEL TIME DIVISION MULTIPLE ACCESS SLOT ASSIGNMENT METHOD FOR A NETWORK OF NODES

TECHNICAL FIELD OF THE INVENTION

The present invention relates to a method for managing communication resources between nodes of a network, and more particularly to a dynamic distributed multi-channel TDMA slot assignment method.

BACKGROUND OF THE INVENTION

Mobile multi-hop broadcast packet radio networks are known for their rapid and convenient deployment, self organization, mobility, and survivability. In this type of network as illustrated in FIG. 1, a transmission from one node, for example node 1, is broadcast to all nodes in its "neighborhood", which at UHF frequencies are typically those nodes (nodes 3, 4, 5, 6, 7, 8)within line-of-sight or one hop of the transmitter. For the transmitted data to propagate multiple hops, the data must be relayed by one or more of these neighbors, for example, nodes 4 and 8, to the nodes (nodes a, b, c, 9) that are two hops away from the original transmitter. In this way the data will be relayed until it has arrived at all intended destination nodes.

Since there are generally limitations on the number of simultaneous transmitters that a receiver can successfully process (typically one), collisions can be avoided by assigning time slots in which individual nodes can transmit. There are many approaches to deciding which nodes are assigned which slots, and the approach is generally driven by the network applications: broadcast, multicast, unicast, datagrams, virtual circuits, etc. Since the problem of optimally assigning slots in this environment is mathematically intractable, typically a heuristic approach is taken to design an integrated protocol that both chooses the number of slots to assign to each neighboring node and coordinates their activation in the network. The approach of the present invention is different in that it proposes a single generalized protocol for reliably choosing the slots and coordinating their activation with minimal overhead which can then be used to support many different higher layer heuristics for selecting the number of slots to be activated with which neighbors.

A need has thus arisen for an improved assignment protocol for use in a distributed multi-channel time division multiple access architecture of a mobile multi-hop broadcast packet radio network.

SUMMARY OF THE INVENTION

In accordance with the present invention, a method is provided for automatically managing the communication channel resources between two nodes having neighboring nodes in a network of transceiver nodes, wherein each node communicates during specific time slots and uses multiple frequencies on a time division multiple access basis. The method includes the steps of storing a table of possible communication frequencies and time slots between nodes. An additional step includes announcing and transmitting during a specific time slot, a selected transmit frequency and slot from a first node to a second node and all neighboring nodes of the first node. The announced frequency and slot have certain constraints on reuse within two hops of the transmitting node to thereby establish contention free communication on that frequency and slot between the first and second nodes.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

The present method assumes the node hardware consists of a simplex transceiver with an omnidirectional antenna. Thus, a node cannot transmit and receive at the same time, and a node cannot receive from more than one other node at a time. In fact, two nodes transmitting at the same time who are both within transmission range of an intended receiver will prevent the receiver from receiving any packet successfully. However, slight variations to the data structures and rules presented here will allow the present method to handle full duplex radios and/or radios with multiple transmitters and receivers.

Figure 1:
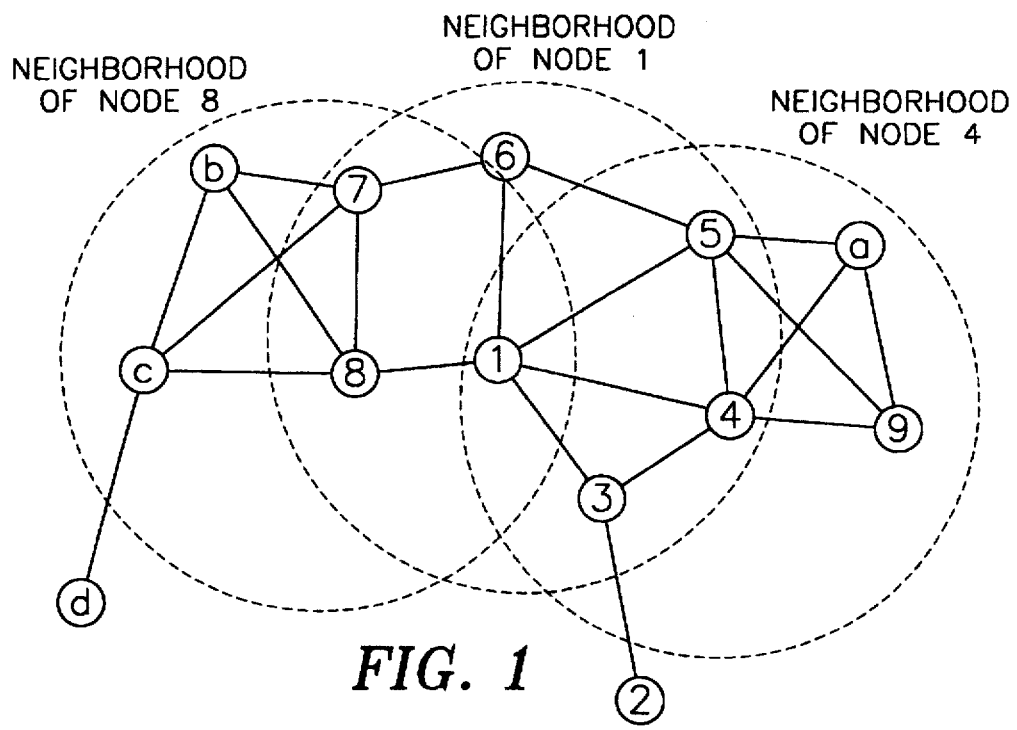
FIG. 1 is a diagram of a network of nodes.
Figure 2:
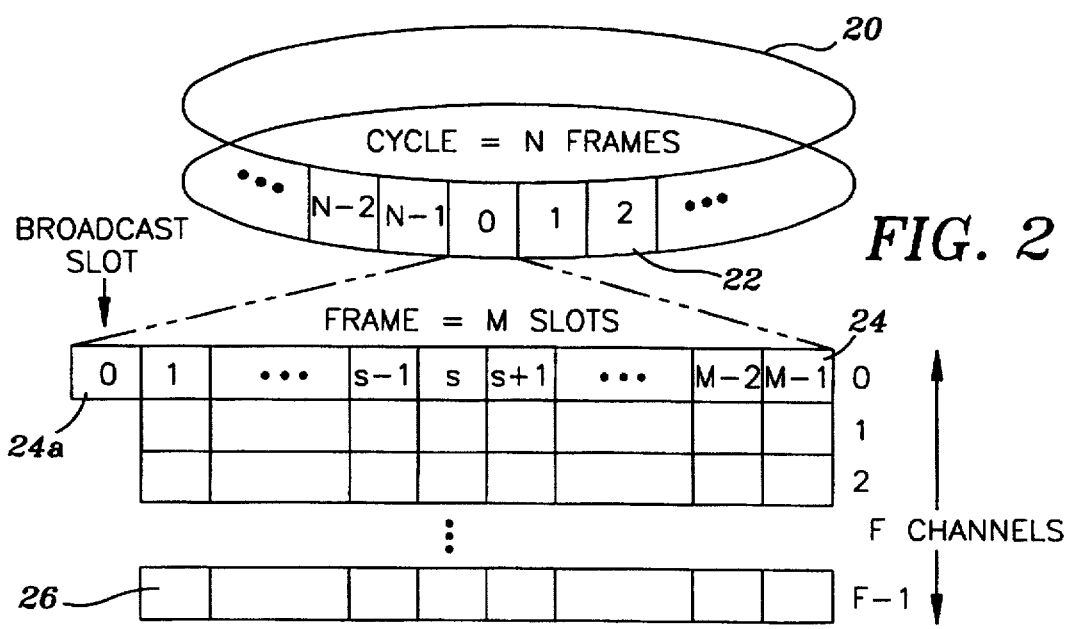
FIG. 2 is a diagram of a time division multiple access structure utilized with the present method.

Referring to FIG. 2, a time division multiple access structure for use with the present method is illustrated. A cycle 20 includes N frames 22. Each frame 22 consists of M slots 24, the first slot 24a is a broadcast slot for network manager control packets. A broadcast slot 24a is assigned to each node in the network, so if there are N nodes, each node has an opportunity to transmit its control packet once every N frames which represents a cycle 20. Additionally, associated with each frame 22 are multiple frequency channels 26.

To reliably share critical network management information with its neighbors, a node will transmit in its assigned broadcast slot 24a. In this slot, all current and potential neighbors of the transmitting node have an opportunity to receive control packets from this node. Control packets contain information required to implement network entry, time slot management, and any other protocol benefiting from the broadcast nature of the control packet, such as routing. The control packets are transmitted at the most robust data rate that can be utilized by user traffic and their size should be minimized since they represent network overhead.

The tasks the present method performs can be broken into two categories:

individual announcing and confirming the assignment of individual slots; and composite using composite bit maps to report assignments, bring new neighbors up-to-date, and to detect and and connect conflicting assignments.

The information shared between neighbors is somewhat different for the individual and composite tasks. The individual information is incremental in that it consists only of the slots being assigned. The composite information consists of entire bit maps shared in every control packet. Here the data structures are presented that are stored at and/or shared between neighbors:

Slot Assignments $S = \text{set of slots} = \{s | s=1,2, \ldots, M\}$     (1)

$F = \text{set of channels} = \{f | f=1,2, \ldots, F\}$     (2)

For a given channel and slot pair (s,f):

Self Tx/Rx Sets:

$$STNi(s,f) = \text{neighbors to which a node is transmitting on } (s,f) \quad (3)$$

$$SRNi(s,f) = \text{neighbors from which a node is receiving on } (s,f) \quad (4)$$

from which the following are derived:

$$STi(s,f) = 1 \text{ if } STNi(s,f) \text{ not empty, else } 0 \quad (5)$$

$$SRi(s,f) = 1 \text{ if } SRNi(s,f) \text{ not empty, else } 0 \quad (6)$$

Neighbor Tx/Rx Sets:

$$STj(s,f) = \text{the } STi(s,f) \text{ reported by a neighbor} \quad (7)$$

$$SRj(s,f) = \text{the } SRi(s,f) \text{ reported by a neighbor} \quad (8)$$

from which the following are derived:

$$NTi(s,f) = \cup STj(s,f) \text{ over all neighbors of a node} \quad (9)$$

$$NRi(s,f) = \cup SRj(s,f) \text{ over all neighbors of a node} \quad (10)$$

$$NTj(s,f) = \text{the } NTi(s,f) \text{ reported by a neighbor} \quad (11)$$

Defined but not used:

$$NRj(s,f) = \text{the } NRi(s,f) \text{ reported by a neighbor} \quad (12)$$

If a node or its neighbor is transmitting or receiving (on any channel) in slots s, it is blocked from doing anything else. To this end, the following derived tables are useful:

$$Bi(s) = STi(s,f) \cup SRi(s,f) \text{ for any } f \quad (13)$$

$$Bj(s) = STj(s,f) \cup SRj(s,f) \text{ for any } f \quad (14)$$

A feature of the present method is that every node is responsible only for assigning (s,f) pairs on which it will transmit and not on (s,f) pairs which it will receive. By assigning only transmit (s,f) pairs, a node must share less information with its neighbors. Thus, to deride what slots and channels are available for assignment, a node i constructs the blocked (s,f) pairs for transmitting to node j by excluding (s,f) pairs:

that have already been assigned to either node: $Bi(s) \cup Bj(s)$ and node i's neighbors are receiving in: $NRi(s,f)$ and node j's neighbors are transmitting in: $NTj(s,f)$ This information is combined as follows:

$$Blocked(i,j,s,f) = Bi(s) \cup Bj(s) \cup NRi(s,f) \cup NTj(s,f) \quad (15)$$

$$= 1 \text{ if } i \text{ cannot transmit to } j \text{ in } (s,f) \quad (16)$$

else 0

Figure 3:
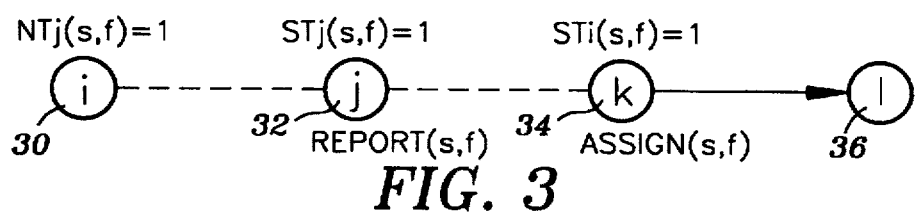
FIG. 3 is an illustration of nodes in a network.

Referring to FIG. 3, illustrating nodes i,j,k, and l which each have a unique identifier (30, 32, 34, and 36, respectively), node 34 assigns itself (s,f) to transmit to node 36. This slot and frequency is associated with the unique identifier of node 36 and is announced in node 34's control packet. Node 32 hears this and stores it as its STj(s,f) table for neighbor 34 and reports it in its control packet as part of its NTi(s,f). When node 30 hears this, it stores it as its NTj(s,f) for neighbor 32. Thus, if node 30 wishes to assign itself a transmit slot to neighbors 32, (s,f) would be unavailable to it by the definition of Blocked(i,j,s,f) (Equation 15). However, another neighbor of 30, that is not a neighbor of a neighbor 34, would be free to reassign (s,f) because it would be more than two hops away from node 34.

Nodes use the control packets to keep the data structures up-to-date that are combined to create Blocked(i,j,s,f). In this way, a node needing a slot assignment can make it immediately. Thus, instead of a three-way handshake, a node merely announces the new slot assignment(s) in a control packet, and all of its neighbors update their tables.

One way for a node to detect conflicts is for it to compare its SRNi(s,f) with the STj(s,f) received from its neighbors. From these structures a node can determine if it is scheduled to receive from one neighbor while another is transmitting, which is not allowed. In this case, this node must convey to its transmitting node that the slot has been dropped and must be reassigned. Other methods of conflict detection and resolution will be subsequently described.

To carry out the individual and composite tasks, a node transmits the following information at the indicated rate:

| Task | Information Shared | Rate |
| --- | --- | --- |
| individual | (s,f) | on announcement or confirmation |
| composite | STi(s,f), SRi(s,f), NTi(s,f) | every control packet |

When a node transmits a control packet, the node includes a section for each neighbor, in which it will put the (s,f) being announced or confirmed. This node announces or confirms with respect to the neighbor in whose control padset section the (s,f) pair appears. With respect to the individual task, when a neighbor of the transmitter transmits a control packet containing an announcement, it will update its STj(s,f), NTi(s,f), and, if it is the receiver, its SRi(s,f), the last two of which will be included in the next control packet along with the STi(s,f). With respect to the composite task, upon reception of a control packet, nodes store the STi(s,f) as an STj(s,f), the SRi(s,f) as an SRj(s,f) and the NTi(s,f) as an NTj(s,f). Nodes also pass status information in the control packet so that a node can determine when a neighbor has heard its last control packet. When a neighbor of the transmitter has determined that all of its neighbors have heard at least one control packet from it since it heard an announcement for an (s,f) pair, it will confirm the pair in its next control packet with respect to the transmitter. When the transmitter receives this control packet, it will consider the (s,f) pair confirmed. The transmitter will continue announcing the (s,f) pair in subsequent control packets until it gets a confirmation from all of its neighbors. In this way, the knowledge of the transmitter's assignment of (s,f) propagates two hops.

When the transmitter no longer needs (s,f), it releases the slot by deleting the receiver from its STNi(s,f) and deleting (s,f) from its STi(s,f). When the neighbors of the transmitter receive its next control packet they will update their STj(s,f) and NTi(s,f), the latter of which will be included in their next control packet so that the knowledge of the transmitter's release of (s,f) will propagate two hops. In addition, when the receiver hears the transmitter's control packet with the updated STi(s,f), it will delete the transmitter from its SRNi(s,f) and (s,f) from its SRi(s,f). In this way, (s,f) will once again be available for assignment under the constraints of Equation 15 within the two hop radius of the transmitter. This last mechanism at the receiver also allows it to detect when it has a conflicting time division multiple access schedule. While comparing the $STj(s,f)$ of neighbor j with its $SRNi(s,f)$ to see if a transmitter has dropped $(s,f)$, it can also check to see if it is assigned to receive from a neighbor other than j in a slot in which j is transmitting, which would be illegal. In either case, it will delete the transmitter from its $SRNi(s,f)$ and $(s,f)$ from its $SRi(s,f)$. In the case of a conflict, after the receiver's next control packet the transmitter will recognize that it has dropped $(s,f)$ and take the appropriate action.

The data structures previously described are designed to prevent conflicts at a receiver due to two transmitters within its neighborhood using the same frequency. In some networks it may be desirable to reduce the noise floor at the receivers by adding an additional hop of isolation before a frequency is reassigned. This can be accomplished by defining the set of nodes that are transmitting within three hops of a node on an $(s,f)$ pair as:

$$NNTi(s,f) = \cup NTj(s,f) \text{ over all neighbors of a node} \quad (17)$$

If this is also included in the control packet then it can be stored at the neighbors of a node as $NNTj(s,f)$ and then they can generate Blocked $(i,j,s,f)$ as follows, which will prevent conflicting transmissions within three hops of a transmitter:

$$Blocked(i,j,s,f) = Bi(s) \cup Bj(s) \cup NRi(s,f) \cup NTj(s,f) \cup NNTj(s,f) \quad (18)$$

$$= 1 \text{ if node } i \text{ cannot transmit to neighbor } j \quad (19)$$

in $(s,f)$, else 0

Conflicting assignments among neighbors as a result of unfortunate timing or missed packets can be defined as transmit conflicts and receive conflicts.

A transmit conflict can be detected by the transmitter of an assignment. Since all information about assignments are spread via the control packets, the transmitter must examine the various records contained in a control packet to detect conflicts. Thus, there are basically three types of records that the transmitter can examine: the announcement records, the confirmation records, and the $SRi(s,f)$ record. The other composite records, $STi(s,f)$ and $NTi(s,f)$, are necessary to make assignments but do not contain any additional information that the transmitter can use to detect conflicts. Each of these records detect and resolve conflicts as follows:

1) The announcement records:

Node i is announcing (or has finished announcing) $(s,f)$ and it receives a control packet from a (new) neighbor also announcing and one of the following conditions is true:
  (a) The pair that the neighbor is announcing has the same slot s and one of the following is true:
    i) it is with respect to node i, then the resolution is to reject the transmitter's announcement;
    ii) it with respect to node i's receiver, then the resolution is to ignore, and let the receiver reject the transmitters announcement;
    iii) the neighbor is node i's receiver, then the the resolution is to accept and drop self as the transmitter;
  (b) The pair that the neighbor is announcing has the same slot s and frequency f and is with respect to a neighbor of node i, then the resolution is to ignore, and let the receiver reject one of two transmitters.

Condition (a) arises because node i and its receiver are blocked on all frequencies in slot s and it is illegal for another node to transmit to either of these nodes in that slot or for the receiver to transmit at all in that slot. Condition (b) arises because all of node i's neighbors are blocked on $(s,f)$ and it is illegal for any other node to transmit to them on $(s,f)$.

2) The confirmation records:

Node i is announcing or has finished announcing $(s,f)$ and it receives a control packet and it is from a (new) neighbor confirming $(s,f)$ with respect to another node, then the resolution is to drop self as a transmitter.

3) The $SRi(s,f)$ record which is stored at a node as the $SRi(s,f)$ for each neighbor:

Node i is announcing or has finished announcing $(s,f)$, the neighbor's control packet indicates it heard node i's last control packet in which $(s,f)$ was identified as assigned by node i, and one of the following conditions is true:
  (a) the $SRj(s,f)$ of the receiver indicates that it is not receiving in $(s,f)$, then the resolution is to drop self as transmitter.
  (b) The $SRj(s,f)$ of a neighbor other than receiver indicates that it is receiving in $(s,f)$, then the resolution is to ignore, and let the neighbor reject the other transmitter.

Condition (a) is an indirect indication of a conflict because the receiver has detected a receive conflict with another node and abandoned the slots. Condition (b) can occur when the transmitter exchanges control packets with a new neighbor for the first time.

A receive conflict can be detected by the neighbors of a transmitter and whose presence must then be conveyed back to the transmitter so that it can take corrective action. As in the case of a transmit conflict, there are basically three types of records from the control packet that the neighbor can examine: the announcement records, the confirmation records, and the $STi(s,f)$ record. The other composite records, $SRi(s,f)$ and $NTi(s,f)$ contain no additional information that the neighbor can use to detect conflicts. Each of these records detect and resolve conflicts as follows:

1) The announcement records:

Node i receives a control packet from a neighbor announcing $(s,f)$ and one of the following conditions is true:
  (a) Node i is the receiver in the announcement but node i's $SRNi(s,f)$ indicates that it is the receiver for a different transmitter on slots, the resolution is to reject the transmitter's announcement.
  (b) Node i is not the receiver in the announcement but node i's $SRNi(s,f)$ indicates that it is the receiver for a different transmitter on $(s,f)$, the resolution is to reject the transmitter's announcement.

Condition (a) arises because a receiver is blocked on all frequencies in slots and it is illegal for another node to transmit to it in that slot. Likewise, condition (b) raises because all of the transmitter's neighbors are blocked on $(s,f)$ and it is illegal for any other node tO transmit to them on $(s,f)$.

2) The confirmation records:

Node i receives a control packet from a neighbor confirming $(s,f)$ (where node i is not the transmitter) and the transmitter is a neighbor of node i and node i's $SRNi(s,f)$ indicates that it is a receiver on $(s,f)$. There cannot be two transmitters in the neighborhood of a single receiver or one transmitter transmitting to two receivers, the resolution is to drop neighbor from $SRNi(s,f)$ for $(s,f)$.

3) The $STi(s,f)$ record, which is stored at a node as the $STj(s,f)$ for each neighbor:

Node i compares its SRNi(s,f) with the STj(s,f) of each neighbor and finds that one neighbor is transmitting on (s,f) while it is scheduled to receive from another on (s,f), the resolution is to drop neighbor from SRNi(s,f) for (s,f).

Therefore, it can be seen that the present invention provides for a protocol for a time division multiple access architecture of a mobile multi-hop broadcast radio network that is capable of supporting different types of higher layer protocols for slot assignment process. The present protocol provides for a slot assignment protocol that is reliable, fast, flexible and functional.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method for automatically managing the communication channel resources between two nodes having neighboring nodes in a network of transceiver nodes, wherein each node communicates during specific time slots and uses multiple frequencies on a time multiplex basis, the method comprising the steps of:

storing a table of possible communication time slots and frequencies between nodes in the network at each node;

announcing and transmitting from a first node during a specific time slot, a selected transmit slot and frequency and the identification of a second node to all neighboring nodes of the first node comprising a first set of neighboring nodes;

transmitting from the first node a control packet containing:

the set of transmit slot and frequency pairs on which the first node is transmitting;

the set of slot and frequency pairs on which the first node is receiving; and the set of slot and frequency pairs on which the first set of neighboring nodes are transmitting on; and identifying in the tables of each of the nodes of the first set of neighboring nodes the announced selected transmit slot and frequency used to establish contention free communication on the selected transmit slot and frequency between the first and second nodes.

2. The method of claim 1 and further including the step of:

transmitting from the first set of neighboring nodes to all neighboring nodes of each node in the first set of neighboring nodes comprising a second set of neighboring nodes, the announced transmit slot and frequency used to establish contention free communication between the first and second nodes, and identifying in the tables of each of the second set of neighboring nodes the announced slot and frequency.

3. The method of claim 2 and further including the steps of:

the first set of neighboring nodes each receiving confirmation from a second set of neighboring nodes that the announced slot and frequency have been identified in the tables of the second set of neighboring nodes; and the first node receiving confirmation from the first set of neighboring nodes that the announced slot and frequency have been identified in the tables of the second set of neighboring nodes.

4. The method of claim 3 and further including the step of:

transmitting a confirmed message from the second node to the first node thereby establishing communication using the selected transmit slot and frequency.

5. The method of claim 2 and further including the step of:

identifying, to the first set of neighboring nodes, slot and frequencies not being used by the first node to thereby make available unused slots and frequencies to the first and second sets of neighboring nodes.

6. The method of claim 1 and further including the step of:

resolving conflicts between nodes which have announced a desire to transmit on a same slot and frequency.

\* \* \* \* \*